United States Patent
Alkhateeb et al.

(10) Patent No.: US 12,381,616 B2
(45) Date of Patent: Aug. 5, 2025

(54) RELAY-AIDED INTELLIGENT RECONFIGURABLE SURFACES

(71) Applicant: ARIZONA BOARD OF REGENTS ON BEHALF OF ARIZONA STATE UNIVERSITY, Scottsdale, AZ (US)

(72) Inventors: Ahmed Alkhateeb, Chandler, AZ (US); Umut Demirhan, Tempe, AZ (US); Xiaoyan Ying, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 427 days.

(21) Appl. No.: 17/996,264

(22) PCT Filed: Jun. 11, 2021

(86) PCT No.: PCT/US2021/036953
§ 371 (c)(1),
(2) Date: Oct. 14, 2022

(87) PCT Pub. No.: WO2021/252858
PCT Pub. Date: Dec. 16, 2021

(65) Prior Publication Data
US 2023/0198605 A1    Jun. 22, 2023

Related U.S. Application Data

(60) Provisional application No. 63/038,070, filed on Jun. 11, 2020.

(51) Int. Cl.
*H01Q 3/46* (2006.01)
*H01Q 15/14* (2006.01)
(Continued)

(52) U.S. Cl.
CPC ......... *H04B 7/15507* (2013.01); *H01Q 15/14* (2013.01); *H01Q 19/104* (2013.01); *H01Q 19/18* (2013.01); *H04B 7/0617* (2013.01)

(58) Field of Classification Search
None
See application file for complete search history.

(56) References Cited

U.S. PATENT DOCUMENTS

| 2003/0016737 | A1 | 1/2003 | Wu et al. |
| 2019/0327625 | A1 | 10/2019 | Patel et al. |

(Continued)

OTHER PUBLICATIONS

International Search Report and Written Opinion mailed Sep. 16, 2021 in corresponding International Application No. PCT/US2021/036953, 13 pages.
(Continued)

*Primary Examiner* — Gary Lafontant
(74) *Attorney, Agent, or Firm* — MH2 Technology Law Group LLP

(57) ABSTRACT

Relay-aided intelligent reconfigurable surfaces (IRSs) are provided. A novel relay-aided intelligent surface architecture is described herein that has the potential of achieving the promising gains of IRSs with a much smaller number of elements, opening the door for realizing these surfaces in practice. A half-duplex or full-duplex relay is connected to one or more IRSs. This merges the gains of relays and reconfigurable surfaces and splits the required signal-to-noise ratio (SNR) gain between them. This architecture can then significantly reduce the required number of reconfigurable elements in the IRS(s) while achieving the same spectral efficiencies. Consequently, the proposed relay-aided intelligent surface architecture needs far less channel estimation/beam training overhead and provides enhanced robustness compared to traditional IRS solutions.

21 Claims, 10 Drawing Sheets

(51) Int. Cl.
*H01Q 19/10* (2006.01)
*H01Q 19/18* (2006.01)
*H04B 7/06* (2006.01)
*H04B 7/155* (2006.01)

(56) References Cited

U.S. PATENT DOCUMENTS

2020/0028262 A1* 1/2020 Fang .................. H01Q 3/46
2020/0136718 A1 4/2020 Fang

OTHER PUBLICATIONS

3GPP TR 38.901 version 14.1.1 Release 14, "Study on channel model for frequencies from 0.5 to 100 GHz,", Tech. Rep., 2017.

Alkhateeb et al., "MIMO precoding and combining solutions for millimeter-wave systems," IEEE Commun. Mag., vol. 52, No. 12, pp. 122-131, Dec. 2014.

Alkhateeb et al., "Deep learning coordinated beamforming for highly-mobile millimeter wave systems," IEEE Access, vol. 6, pp. 37 328-37 348, 2018.

Basar et al., "Wireless communications through reconfigurable intelligent surfaces," IEEE Access, vol. 7, pp. 116 753-116 773, 2019.

Bjornson et al., "Intelligent reflecting surface vs. decode-and-forward: How large surfaces are needed to beat relaying?" IEEE Wireless Commun. Lett., Feb. 2020.

Bjornson et al.,"Power scaling laws and near-field behaviors of massive MIMO and intelligent reflecting surfaces," Sep. 2020.

Bohagen et al. "Design of optimal high-rank line-of-sight MIMO channels," IEEE Trans. Wireless Commun., vol. 6, No. 4, pp. 1420-1425, Apr. 2007.

Cheng et al., "Channel modeling and analysis of ULA massive MIMO systems," in Proc. 20th Int. Conf. Advanced Communication Technology (ICACT), Feb. 2018, pp. 411-416.

Direnzo et al., "Reconfigurable in-telligent surfaces vs. relaying: Differences, similarities, and performance comparison," 798-807, Jul. 2020.

Direnzo et al., , "Smart radio environments empowered by reconfigurable intelligent surfaces: How it works, state of research, and road ahead," 2450-2525, Nov. 2020.

Heath et al., "An overview of signal processing techniques for millimeter wave MIMO systems," IEEE Journal of Selected Topics in Signal Processing, vol. 10, No. 3, pp. 436-453, Apr. 2016.

Hu et al.,"Beyond massive MIMO: The potential of data transmission with large intelligent surfaces," IEEE Trans. Signal Process., vol. 66, No. 10, pp. 2746-2758, May 2018.

Huang et al., "Reconfigurable intelligent surfaces for energy efficiency in wireless communication," IEEE Trans. Wireless Commun., vol. 18, No. 8, pp. 4157-4170, Aug. 2019.

Laneman et al., "Cooperative diversity in wireless networks: Efficient protocols and outage behavior," IEEE Trans. Inf. Theory, vol. 50, No. 12, pp. 3062-3080, Dec. 2004.

Larsson et al., "Massive MIMO for next generation wireless systems," IEEE Commun. Mag., vol. 52, No. 2, pp. 186-195, Feb. 2014.

Lu et al., "An overview of massive MIMO: Benefits and challenges," IEEE J. Sel. Topics Signal Process., vol. 8, No. 5, pp. 742-758, Oct. 2014.

Marzetta, "Noncooperative cellular wireless with unlimited numbers of base station antennas," IEEE Transactions on Wireless Communica-tions, vol. 9, No. 11, pp. 3590-3600, Nov. 2010.

Roh et al., "Millimeter-wave beamforming as an enabling technology for 5g cellular communications: theoretical feasibility and prototype results," IEEE Commun. Mag., vol. 52, No. 2, pp. 106-113, Feb. 2014.

Taha et al., "Enabling Large Intelligent Surfaces with Compressive Sensing and Deep Learning," arXiv e-prints, p. arXiv:1904.10136, Apr. 2019.

Taha et al., "Deep reinforcement learning for intelligent reflecting surfaces: Towards standalone operation," 2020, 5 pages.

* cited by examiner

RELAY-AIDED INTELLIGENT RECONFIGURABLE SURFACES

RELATED APPLICATIONS

This application is a national stage entry under 35 U.S.C. § 371 of PCT Application No. PCT/US2021/036953 entitled "RELAY-AIDED INTELLIGENT RECONFIGURABLE SURFACES" filed Jun. 11, 2021, which claims the benefit of U.S. Provisional Application No. 63/038,070, filed Jun. 11, 2020, the disclosures of which are hereby incorporated herein by reference in their entireties.

FIELD OF THE DISCLOSURE

The present disclosure relates to intelligent reconfigurable surfaces (IRSs) for wireless communications, such as radio frequency (RF) communications.

BACKGROUND

Wireless communications systems in fifth generation (5G) and beyond use multi-antenna technologies such as multiple-input-multiple-output (MIMO) and massive MIMO with higher frequency signals than previous systems (e.g., in the millimeter wave (mmWave) band in 5G and sub-terahertz bands in sixth generation (6G) and beyond). The large bandwidth available at these high frequencies enables the communication systems to send data with very high data rates. However, a major challenge that these systems face is network coverage. This is because these high frequencies do not penetrate well in most objects, making them more susceptible to blockages of wireless communication links.

To overcome this challenge, the concept of intelligent reconfigurable surfaces (IRS) has been recently proposed and attracted massive interest from academia, industry, and defense. IRSs are devices that comprise large numbers of controllable nearly-passive reflecting elements. These low-cost devices reflect and focus incident signals towards intended receivers to enhance the network coverage and provide a way to avoid or mitigate blockages of wireless communication links. A major challenge for current IRS systems, however, is that they need a massive number of elements to meet their power gain promises. The large numbers of elements consequently require extremely large channel estimation/beam training overhead (to find the best direction to point very narrow beams). Further, since the beams of these systems are extremely narrow, the users may easily go out of coverage with any small movements. The above issues can render real deployment of these systems infeasible.

A more widely accepted method for adapting wireless communication environment is by using relay stations, which may also generate additional wireless routes toward a destination. While both relays and intelligent surfaces are relatively similar, a relay plays the role of receiving and retransmitting the signal with amplification. Comparisons between intelligent surfaces and decode-and-forward (DF)/amplify-and-forward (AF) relays have reached the conclusion that an IRS needs hundreds of reconfigurable elements to be competitive against relays. However, conventional relays lack the ability to focus a signal, which limits their application for wireless coverage and increases interference to unintended receivers. Further, MIMO relays are costly and bulky with high power consumption.

SUMMARY

Relay-aided intelligent reconfigurable surfaces (IRSs) are provided. A novel relay-aided intelligent surface architecture is described herein that has the potential of achieving the promising gains of IRSs with a much smaller number of elements, opening the door for realizing these surfaces in practice. A half-duplex or full-duplex relay is connected to one or more IRSs. This merges the gains of relays and reconfigurable surfaces and splits the required signal-to-noise ratio (SNR) gain between them. This architecture can then significantly reduce the required number of reconfigurable elements in the IRS(s) while achieving the same spectral efficiencies. Consequently, the proposed relay-aided intelligent surface architecture needs far less channel estimation/beam training overhead and provides enhanced robustness compared to traditional IRS solutions.

In one aspect, the proposed architecture splits the reflection process over two intelligent surfaces connected wired or wirelessly by a relay. This allows leveraging full-duplex relays with practical isolation. Further, this enables the proposed architecture to be deployed in very flexible ways by optimizing the position and orientation of the two surfaces, which leads to much better coverage. Other examples embed the relay within one or multiple IRSs to (e.g., via wired connection to one or each of multiple IRSs) to provide amplification in addition to the beamforming of the IRS(s).

After describing the proposed architecture, this disclosure develops an accurate mixed near-far field channel model that describes the composite channel between a transmitter/receiver pair and the relay through the IRS surfaces. Further, the disclosure derives closed-form expressions for the achievable rates using the proposed relay-aided intelligent surface architecture with decode-and-forward (DF) and amplify-and-forward (AF) relays. Finally, these rates are evaluated using numerical simulations which further highlight the promising gains of the proposed architecture.

An exemplary embodiment provides a relay for an intelligent surface device. The relay includes a first antenna port configured to receive a first signal from a first IRS; amplification circuitry configured to amplify the first signal; and a second antenna port configured to send the amplified first signal to be transmitted from a second IRS.

Another exemplary embodiment provides a method for providing amplified signal reflection. The method includes receiving a first signal at a first IRS, the first IRS comprising a first array of reconfigurable elements; beamforming and reflecting the first signal from the first IRS toward a relay; and retransmitting the first signal from the relay to a second IRS, the second IRS comprising a second array of reconfigurable elements.

Another exemplary embodiment provides a wireless communications system. The wireless communications system includes a first IRS comprising a first array of reconfigurable elements and a relay. The relay is configured to: amplify and relay a first signal from the first IRS to a second IRS; and amplify and relay a second signal from the second IRS to the first IRS.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
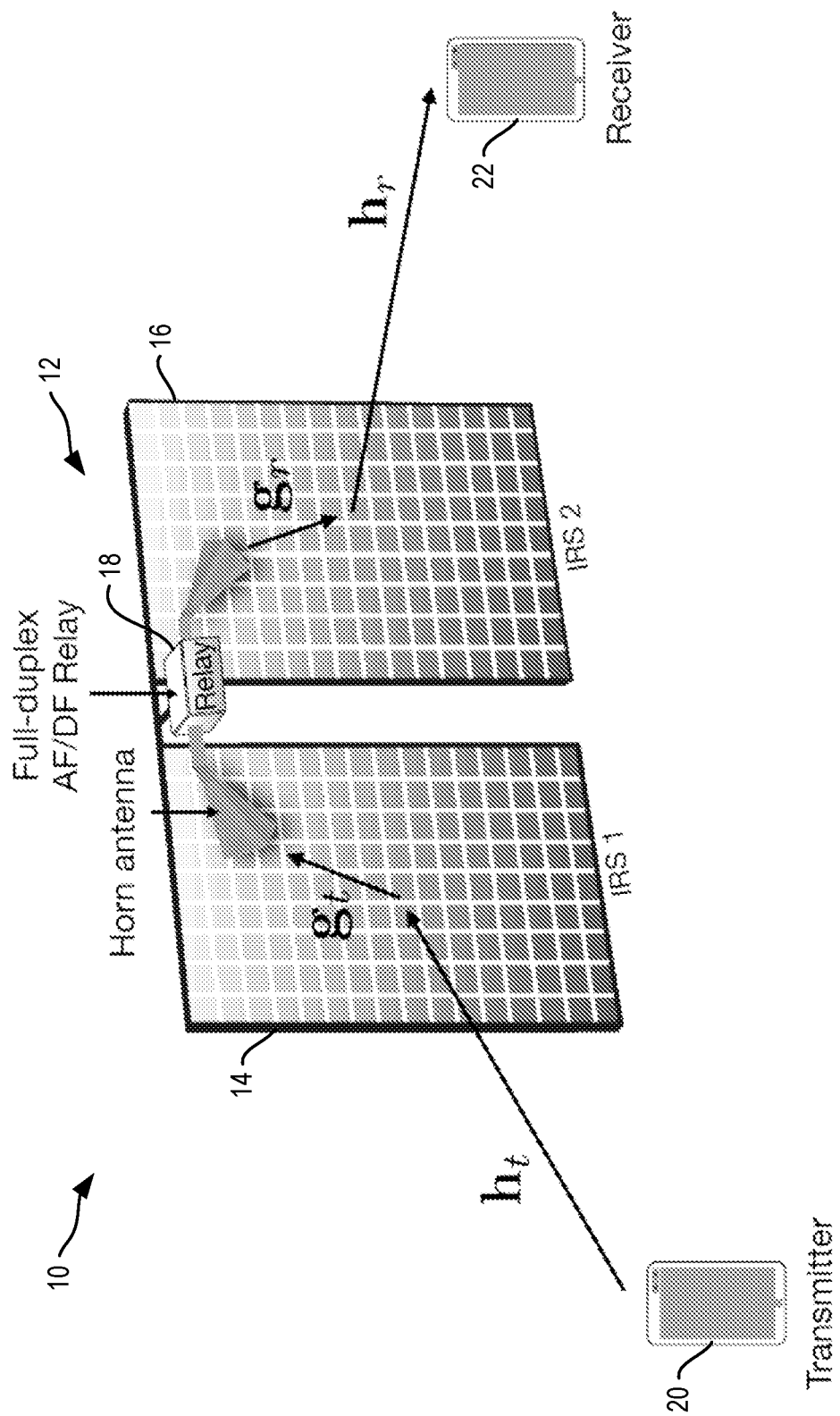
FIG. 1 is a schematic diagram of a wireless communications system which includes a relay-aided intelligent surface device according to embodiments described herein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Relay-aided intelligent reconfigurable surfaces (IRSs) are provided. A novel relay-aided intelligent surface architecture is described herein that has the potential of achieving the promising gains of IRSs with a much smaller number of elements, opening the door for realizing these surfaces in practice. A half-duplex or full-duplex relay is connected to one or more IRSs. This merges the gains of relays and reconfigurable surfaces and splits the required signal-to-noise ratio (SNR) gain between them. This architecture can then significantly reduce the required number of reconfigurable elements in the IRS(s) while achieving the same spectral efficiencies. Consequently, the proposed relay-aided intelligent surface architecture needs far less channel estimation/beam training overhead and provides enhanced robustness compared to traditional IRS solutions.

In one aspect, the proposed architecture splits the reflection process over two intelligent surfaces connected wired or wirelessly by a relay. This allows leveraging full-duplex relays with practical isolation. Further, this enables the proposed architecture to be deployed in very flexible ways by optimizing the position and orientation of the two surfaces, which leads to much better coverage. Other examples embed the relay within one or multiple IRSs to (e.g., via wired connection to one or each of multiple IRSs) to provide amplification in addition to the beamforming of the IRS(s).

After describing the proposed architecture, this disclosure develops an accurate mixed near-far field channel model that describes the composite channel between a transmitter/receiver pair and the relay through the IRS surfaces. Further, the disclosure derives closed-form expressions for the achievable rates using the proposed relay-aided intelligent surface architecture with decode-and-forward (DF) and amplify-and-forward (AF) relays. Finally, these rates are evaluated using numerical simulations which further highlight the promising gains of the proposed architecture.

I. Proposed Architecture: Relay-Aided IRS

IRSs have the potential of enhancing the coverage and data rates of future wireless communications systems. This is particularly important for millimeter wave (mmWave) and terahertz (THz) systems where network coverage is a critical problem. The current approach in realizing these surfaces is through using massive numbers of nearly-passive elements that focus the incident signals towards a desired direction. In order to achieve sufficient receive power, however, these surfaces will typically need to deploy tens of thousands of antenna elements (as described further below in Section VI). Having IRSs with that many antennas carries fundamental problems that may render these surfaces infeasible. In addition to a high production cost, these surfaces have extremely narrow beams which incur massive training overhead with which supporting even low-mobility applications is questioned. Further, narrow beams constitute a critical challenge for the robustness of the communication links as even very small movements may result in a sudden large drop in the receive power. With the motivation of overcoming these challenges and enabling the potential gains of IRSs in practice, a novel architecture is proposed herein based on merging these surfaces with half- or full-duplex relays. Next, the proposed architecture is briefly described and its potential gains are highlighted.

A. Architecture Description

FIG. 1 is a schematic diagram of a wireless communications system 10 which includes a relay-aided intelligent surface device 12 according to embodiments described herein. The core idea of the proposed architecture is to make IRSs 14, 16 capable of amplifying the power of the incident signals without the need to explicitly deploy power amplifiers at the elements of these IRSs 14, 16. This has the potential of splitting the required SNR gain of the relay-aided intelligent surface device 12 between the array gain (using the focusing capability of the IRS 14, 16) and the power amplification gain (using a relay 18).

To achieve this goal, the architecture of FIG. 1 is proposed, where one or more IRSs 14, 16 are connected via a half- or full-duplex relay 18. This architecture operates as follows: When a transmitter 20 (e.g., a wireless device, such as a mobile device or user equipment (UE)) transmits a signal, a first IRS 14 provides this signal to an antenna port (e.g., by reflecting the signal toward a wireless antenna, such as the illustrated horn antenna, or via a wired connection) of the attached relay 18. This relay 18 then amplifies (or decodes) the signal and sends the amplified signal to a second IRS 16 (e.g., by retransmitting it over another wireless antenna or via a wired connection). Finally, the second IRS 16 reflects and focuses the signal towards a target receiver 22 (e.g., another wireless device, such as a mobile device or UE).

When the relay 18 is a full-duplex relay, the two IRSs 14, 16 switch their roles as the direction of communication switches. Note that in an exemplary aspect, the proposed architecture has two different IRSs 14, 16 doing different (transmit/receive) functions at any point in time. This allows employing a full-duplex relay 18 (with reasonable isolation) and enables the proposed relay-aided intelligent surface architecture to continuously reflect the incident signals. In another aspect, the first IRS 14 and the second IRS 16 represent a single IRS 14 with a connected or embedded relay 18 to provide amplification of a signal received from the transmitter 20, while other components of the IRS 14 beamform the amplified signal toward the receiver 22.

1. Examples of the Relay-Aided Intelligent Surface Device

Figure 2A:
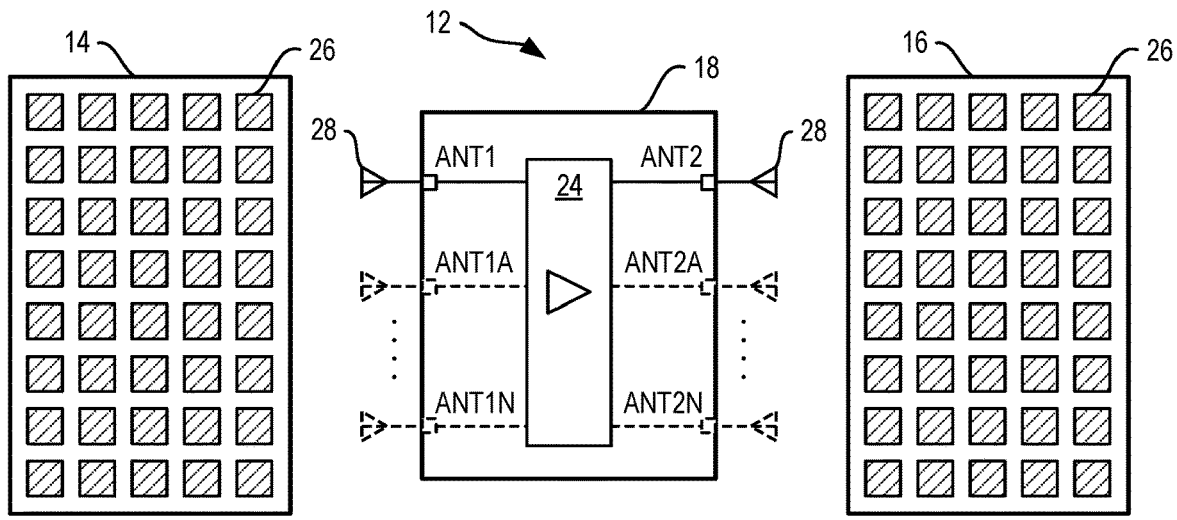
FIG. 2A is a schematic diagram of a wireless relay-aided intelligent surface device according to embodiments described herein.
Figure 2B:
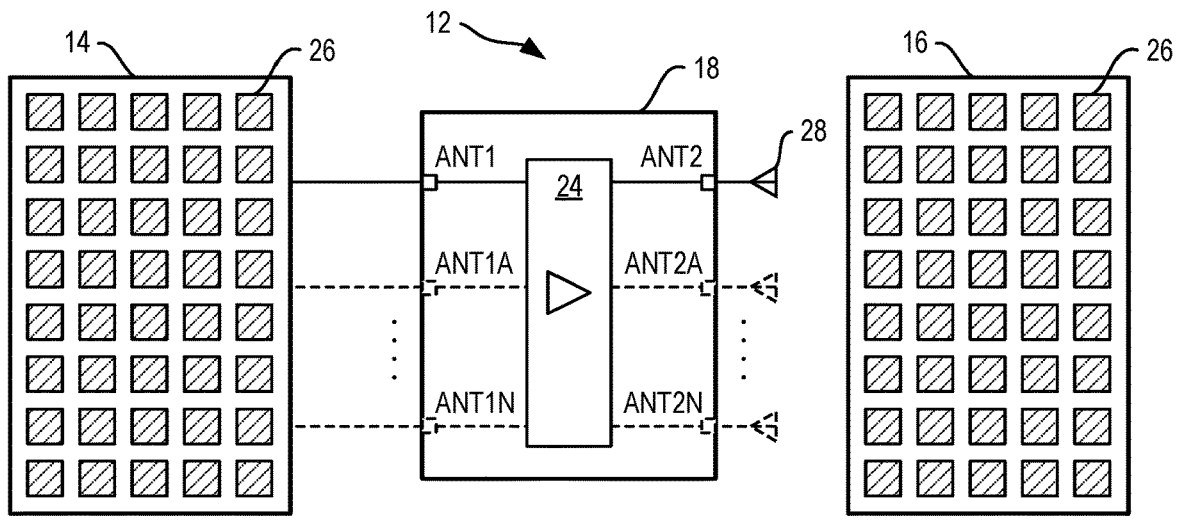
FIG. 2B is a schematic diagram of a wired and/or wireless relay-aided intelligent surface device according to embodiments described herein.
Figure 2C:
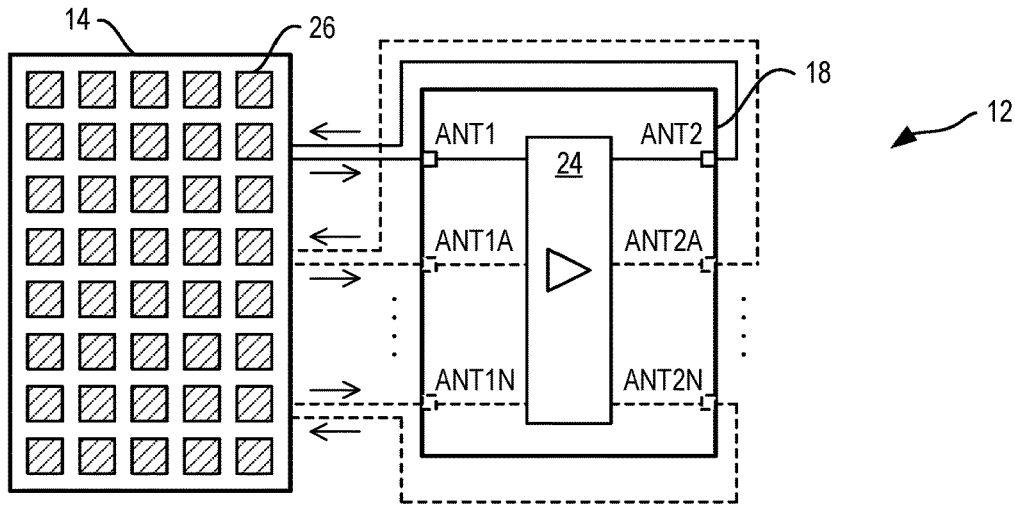
FIG. 2C is a schematic diagram of a relay-aided intelligent surface device having a relay embedded within an intelligent reconfigurable surface (IRS) according to embodiments described herein.

Embodiments of the relay-aided intelligent surface device 12 can be implemented with one or multiple IRSs 14, 16. In addition, communication between the relay 18 and the IRSs 14, 16 can be wireless, wired, or a combination of wired and wireless. FIGS. 2A-2C illustrate exemplary embodiments of the relay-aided intelligent surface device 12.

a. Wireless Embodiments

FIG. 2A is a schematic diagram of a wireless relay-aided intelligent surface device 12 according to embodiments described herein. The relay-aided intelligent surface device 12 includes the relay 18 (in this example, a wireless relay), and may optionally include one or both of the first IRS 14 and the second IRS 16. The relay 18 includes a first antenna port ANT1 which is configured to receive a first signal from the first IRS 14, amplification circuitry 24 configured to amplify the first signal, and a second antenna port ANT2 configured to send the amplified first signal to be transmitted from the second IRS 16. In some embodiments, the relay 18 includes other signal processing circuitry in addition to the amplification circuitry 24, such as signal decoding circuitry, signal conditioning circuitry, control circuitry, logic circuitry, and so on.

Each of the first IRS 14 and the second IRS 16 includes an array of reconfigurable antenna elements 26. As illustrated in FIG. 2A, each of the first antenna port ANT1 and the second antenna port ANT2 is connected to a corresponding antenna 28 aimed toward some or all of the antenna elements 26 in the first IRS 14 and the second IRS 16, respectively. In this regard, the first IRS 14 reflects the first signal (e.g., received from the transmitter 20 of FIG. 1) toward the antenna 28 coupled to the first antenna port ANT1 of the relay 18. The amplification circuitry 24 amplifies the first signal, and the relay 18 transmits the amplified first signal toward the second IRS 16 via the antenna 28 coupled to the second antenna port ANT2 (e.g., to be reflected toward the receiver 22 of FIG. 1). In some embodiments, the relay 18 is configured for full duplex operation, such that the antenna 28 coupled to the second antenna port ANT2 receives a second signal reflected from the second IRS 16, the amplification circuitry 24 amplifies the second signal, and the antenna 28 coupled to the first antenna port ANT1 transmits the amplified second signal toward the first IRS 14.

Each of the antennas 28 can be a horn antenna, a phased antenna array, or another appropriate antenna for sending and receiving signals reflected from the IRSs 14, 16. As described further below, in some embodiments the first IRS 14 and the second IRS 16 can be separated from one another and may further be oriented in different directions. In some embodiments the first IRS 14 is collocated and oriented substantially parallel with the second IRS 16.

In some embodiments, the relay 18 further includes multiple antennas 28 coupled to multiple antenna ports ANT1, ANT1A, ... ANT1N, each of which is aimed toward a portion of the array of antenna elements 26 in the first IRS 14. In some embodiments, the relay 18 further includes multiple antennas 28 coupled to multiple antenna ports ANT2, ANT2A, ... ANT2N, each of which is aimed toward a portion of the array of antenna elements 26 in the second IRS 16. As such, one or multiple amplification paths may be provided through the relay 18. Where multiple amplification paths are provided, the number of amplification paths between the first IRS 14 and the second IRS 16 may be equal, or the number of amplification paths from the first IRS 14 to the second IRS 16 may be different from the number of amplification paths from the second IRS 16 to the first IRS 14.

In some embodiments, multiple amplification paths through the relay 18 may provide for communications with multiple devices or between multiple locations of moving devices. In some embodiments, multiple amplification paths through the relay 18 may provide for communications at different frequency bands. In some embodiments, the wireless relay-aided intelligent surface device 12 includes multiple relays 18 to similarly provide multiple amplification paths (e.g., for different groups of antenna elements and/or at different frequency bands). In some embodiments, the multiple relays 18 can share at least some signal processing circuitry (e.g., amplification circuitry, logic circuitry, etc.).

b. Mixed Wired and Wireless Embodiments

FIG. 2B is a schematic diagram of a wired and/or wireless relay-aided intelligent surface device 12 according to embodiments described herein. As illustrated in FIG. 2B, the relay-aided intelligent surface device 12 includes the relay 18, which is connected to or embedded within the first IRS 14. That is, the first antenna port ANT1 is coupled to one or more of the reconfigurable antenna elements 26 of the first IRS 14 via a wired connection. The second antenna port ANT2 is connected to an antenna 28 aimed toward some or all of the antenna elements 26 in the second IRS 16.

In this regard, the first IRS 14 receives the first signal (e.g., from the transmitter 20 of FIG. 1), which is forwarded to the first antenna port ANT1 of the relay 18. The amplification circuitry 24 amplifies the first signal, and the relay 18 transmits the amplified first signal toward the second IRS 16 via the antenna 28 coupled to the second antenna port ANT2 (e.g., to be reflected toward the receiver 22 of FIG. 1). In some embodiments, the relay 18 is configured for full duplex operation, such that the antenna 28 coupled to the second antenna port ANT2 receives a second signal reflected from the second IRS 16, the amplification circuitry 24 amplifies the second signal, and the first antenna port ANT1 forwards the amplified second signal to the first IRS 14 (e.g., to be beamformed toward the transmitter 20 of FIG. 1).

In some embodiments, the relay 18 further includes multiple wired connections with the first IRS 14 at multiple antenna ports ANT1, ANT1A, ... ANT1N. In some embodiments, the relay 18 further includes multiple antennas 28 coupled to multiple antenna ports ANT2, ANT2A, ... ANT2N, each of which is aimed toward a portion of the array of antenna elements 26 in the second IRS 16. As such, one or multiple amplification paths may be provided through the relay 18 in a manner similar to the embodiment of FIG. 2A.

c. Embedded/Wired Embodiments

FIG. 2C is a schematic diagram of a relay-aided intelligent surface device 12 having a relay embedded within the first IRS 14 according to embodiments described herein. The first antenna port ANT1 is coupled to one or more of the reconfigurable antenna elements 26 of the first IRS 14 via a wired connection. The second antenna port ANT2 is also connected to one or more of the reconfigurable antenna elements 26 of the first IRS 14 via a wired connection.

In this regard, the first IRS 14 includes or is the same as the second IRS 16. The first IRS 14 receives the first signal (e.g., from the transmitter 20 of FIG. 1), which is forwarded to the first antenna port ANT1 of the relay 18. The amplification circuitry 24 amplifies the first signal, and the relay 18 forwards the amplified first signal back to the first IRS 14 (e.g., to be reflected toward the receiver 22 of FIG. 1). In some embodiments, the first antenna port ANT1 and the second antenna port ANT2 are coupled to the same reconfigurable antenna element 26 or group of reconfigurable antenna elements 26. In other embodiments, the first antenna port ANT1 and the second antenna port ANT2 are coupled to different reconfigurable antenna elements 26 or groups of reconfigurable antenna elements 26. In some embodiments, the relay 18 is configured for full duplex operation, such as by reversing the path between the first antenna port ANT1 and the second antenna port ANT2.

In some embodiments, the relay 18 further includes multiple wired connections with the first IRS 14 at multiple antenna ports ANT1, ANT1A, ... ANT1N. In some embodiments, the relay 18 further includes multiple wired connections with the first IRS 14 at multiple antenna ports ANT2, ANT2A, ... ANT2N. As such, one or multiple amplification paths may be provided through the relay 18 in a manner similar to the embodiments of FIGS. 2A and 2B.

2. Motivation and Potential Gains

The proposed relay-aided intelligent surface architecture has several potential gains compared to the classical intelligent surface architecture that has a single surface. Next, these gains are briefly highlighted.

a. Less Number of Elements

To achieve a sufficient SNR gain, the proposed architecture has the possibility to split this required gain between the power amplification gain of the relay 18 and the focusing gain of the IRS(s) 14, 16. This can considerably reduce the required number of elements at the IRS(s) 14, 16.

b. Low Beam Training Overhead

To realize the potential beamforming gain, the reconfigurable antenna elements 26 of the IRSs 14, 16 need to be configured based on the channels between these surfaces and the transmitters/receivers. Acquiring this channel knowledge (or equivalently finding the best beam), however, requires huge training overhead in classical intelligent surfaces that employ massive numbers of elements. This imposes a critical challenge for the feasibility of these surfaces in practical deployments. Given that the proposed architecture has the potential of achieving the same SNR gains with a much smaller number of reconfigurable antenna elements 26 (and hence much less training overhead), it presents an interesting path for realizing these systems in practice.

c. Wider Beams for Higher Robustness

Another critical challenge that follows from employing a massive number of elements in classical intelligent surfaces is the very small beamwidth of the focusing beams. These laser-like beams highly affect the robustness of these systems as the links can be abruptly disconnected with any small movement by the transmitter or the receiver. In contrast, and thanks to requiring a smaller number of reconfigurable antenna elements 26, the proposed relay-aided intelligent surface architecture employs wider beams, which enhances the robustness of the system.

d. Better coverage

Figure 3:
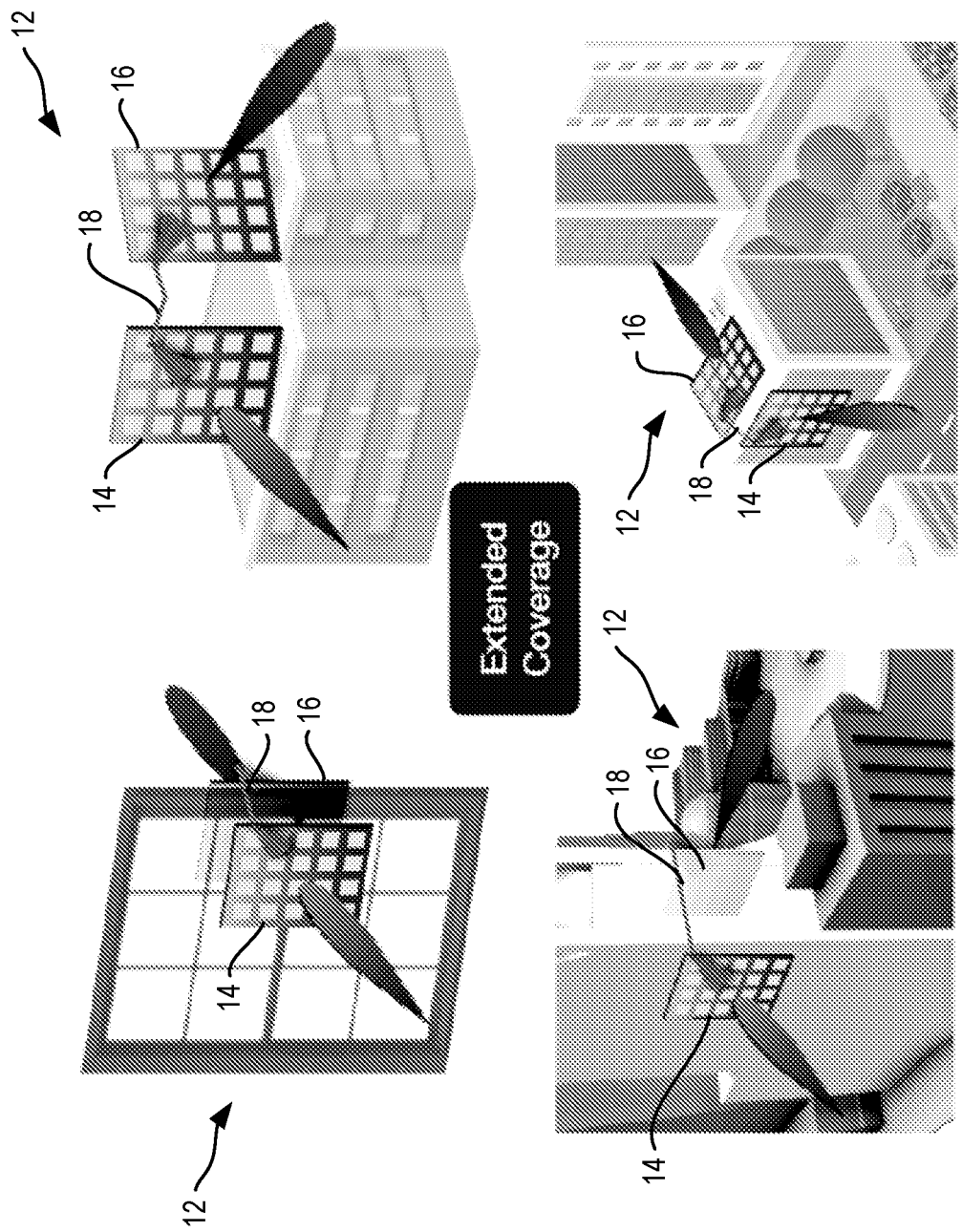
FIG. 3 illustrates applications of the relay-aided intelligent surface device of FIGS. 1-2C to extend coverage of the wireless communications system.

FIG. 3 illustrates applications of the relay-aided intelligent surface device 12 of FIG. 1 to extend coverage of the wireless communications system 10. An interesting characteristic of some embodiments of the relay-aided intelligent surface device 12 is the use of two IRSs 14, 16. This allows moving those two IRSs 14, 16 to extend the communication coverage and overcome potential blockages. FIG. 3 demonstrates some candidate deployment scenarios that highlight the potential of the proposed relay-aided intelligent surface architecture in extending the coverage in wireless networks.

II. System Model

Consider the wireless communications system 10 shown in FIG. 1, where a transmitter 20 and receiver 22 are communicating through the proposed relay-aided intelligent surface device 12. For simplicity, it is assumed that there is no direct line-of-sight link between the transmitter 20 and receiver 22 (assuming this link is either blocked or negligible). Further, a scenario is adopted where the transmitter 20 and receiver 22 have single antennas. The proposed model and results in this disclosure, however, can be extended to cases with multi-antenna transceivers.

When the transmitter 20 sends the signal s, this signal is first reflected by the receive reflecting surface (the first IRS 14 in FIG. 1) to the receiver antenna of the relay 18. This signal is then amplified (in the case of AF relay) or regenerated (in the case of DF relay) before being transmitted to the second reflecting surface (the second IRS 16 in FIG. 1), which reflects the signal towards the receiver 22. It is important to note here that since the two reflect arrays are separated for receiving and transmitting purposes, the proposed relay-aided intelligent surface architecture can efficiently operate in a full-duplex mode, with reasonable isolation between the directional transmit and receive antennas of the relay 18. This allows the proposed relay-aided intelligent surface architecture to work on continuously reflecting the incident signals without requiring additional time resources.

Figure 4:
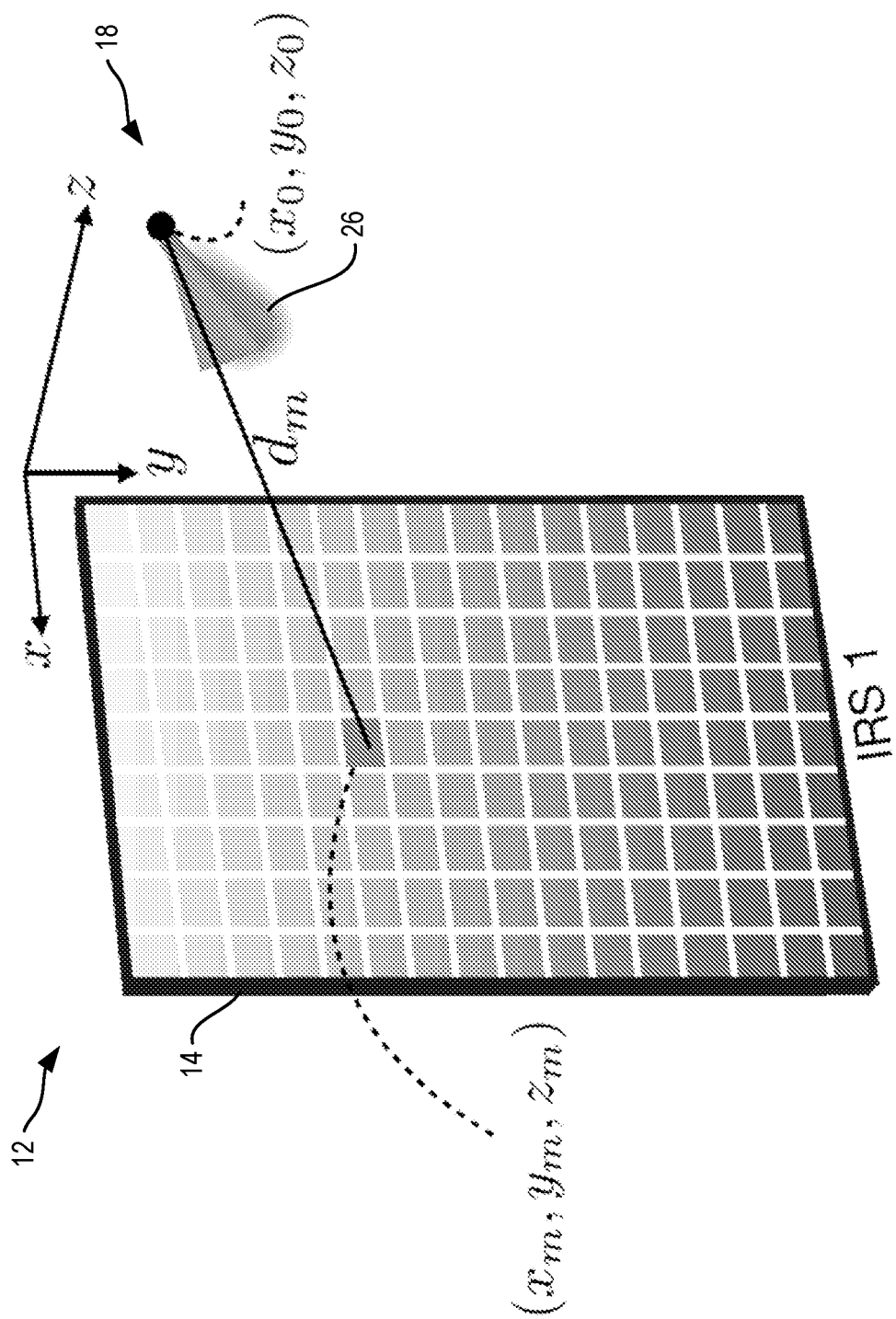
FIG. 4 is a schematic diagram illustrating wireless channels between an IRS and a relay in the relay-aided intelligent surface device of FIGS. 1, 2A, and 2B.

FIG. 4 is a schematic diagram illustrating wireless channels between an IRS 14 and the relay 18 in the relay-aided intelligent surface device 12 of FIGS. 1, 2A, and 2B. Assume that each intelligent surface has M antennas, and let $h_t \in \mathbb{C}^{m \times 1}$ denote the channels between the transmitter and IRS 14, and between IRS 14 and the relay receive antenna. Then, the receive signal at the relay can be written as $$y_{RIR} = \sqrt{p_t} g_t^T \Psi_1 h_t s + n_1 \qquad \text{Equation 1}$$

where $p_t$ denotes the transmit power at the transmitter, s is the transmit symbol with unit average power, and $n_1 \sim N(0, \sigma_1^2)$ is the receive noise at the relay. The M×M diagonal matrix $\Psi_1$ is the interaction matrix of the first intelligent surface (first IRS 14).

If $\psi_1$ denotes the diagonal vector of $\Psi_1$, i.e., $\Psi_1 = \text{diag}(\psi_1)$, then Equation 1 can be rewritten as $$y_{RIR} = \sqrt{p_t} (h_t \odot g_t)^T \psi_1 s + n_1 \qquad \text{Equation 2}$$

where $\odot$ is the Hadamard product. This disclosure focuses on the case when the intelligent surfaces interact with the incident signals via phase shifters, i.e., $\psi_1 = \sqrt{\kappa_1} [e^{j\Phi_1^1}, \ldots, e^{j\Phi_M^1}]$ with $\kappa_1$ representing the power reflection efficiency of the first intelligent surface. At the relay 18, the receive signal is processed by either applying an amplification gain (for the case of AF relay) or decoding followed by retransmission (for DF relays).

For AF relays: An amplification gain $\beta$ will be applied to the receive signals before retransmitting it towards the second intelligent surface (second IRS 16). This surface will then reflect the signal to the receiver 22 using its interaction matrix $\Psi_2$, defined similarly to $\Psi_1$. If $g_r \in \mathbb{C}^{M \times 1}$ and $b_r \in \mathbb{C}^{M \times 1}$ represent the channels between the second IRS 16 and the transmit antennas of the relay 18 and between the second IRS 16 and the receiver 22, then the receive signal at the receiver 22 can then be written as $$y_r = \sqrt{\beta} (h_r \odot g_r)^T \Psi_2 (\sqrt{p_t} (h_t \odot g_t)^T \psi_1 s + n_1) + n_2 \qquad \text{Equation 3}$$

where $n_2 \sim N(0, \sigma_2^2)$ is the receive noise at the receiver.

For DF relays: The receive signals will be decoded and retransmitted with power $p_r$ to the second intelligent surface (second IRS 16), which reflects the signal towards the receiver 22 using its interaction matrix $\Psi_2$. In this case, the receive signal at the receiver can be written as $$y_r = \sqrt{p_r} (h_r \odot g_r)^T \psi_2 s + n_2 \qquad \text{Equation 4}$$

An important note on the transmit and receive side composite channels, $(h_t \odot g_t)$ and $(h_r \odot g_r)$ is that they combine far-field channels $h_t$, $h_r$ and near-field channels $g_t$, $g_r$. In the next section, an accurate model is developed for these channels.

III. Channel Model: Mixed Near-Far Field Model

One important characteristic of the proposed relay-aided intelligent surface architecture is that the channels between intelligent surfaces and the transmitter/receiver can be modeled as far-field channels while the channels between the surfaces and the relay need to adopt near-field modeling. This section describes in detail the composite channel model for the transmit side, which is denoted $h°_t = h_t \odot g_t$. The receive-side composite channel $h°_r = h_r \odot g_r$ can be similarly defined.

Given the description of the relay-aided intelligent surface architecture in Section II, the transmit-side composite channel can be written as $$h°_t = h_t \odot \varsigma_t \odot \Theta_t \qquad \text{Equation 5}$$

where $\varsigma_t$ and $\Theta_t$ are the magnitude and phase vectors of the near-field IRS-relay channel $g_t$, i.e., $g_t = \varsigma_t \odot \Theta_t$.

First, the far-field channel vectors, $h_t$, are described using a geometric channel model. In this model, the signal propagating between the transmitter 20 and the first IRS 14 experiences L clusters, and each cluster contributes with one ray via a complex coefficient $\alpha_\ell \in \mathbb{C}$ and azimuth/elevation angles of arrival, $\theta_\ell^{az}, \theta_\ell^{el} \in [0, 2\pi)$. Hence, the channel $h_t$ can be written by $$h_t = \sum_{\ell=1}^{L} \sqrt{p_t} \, \alpha_\ell a(\theta_\ell^{az}, \theta_\ell^{el}) \qquad \text{Equation 6}$$

where $p_t$ denotes the path loss between the transmitter 20 and the first IRS 14, and $a(\cdot) \in \mathbb{C}^{M \times 1}$ represents the array response vector of the first intelligent surface (the first IRS 14).

For the channel between the intelligent surface and the antenna (e.g., a horn antenna), given the small distance between them, near-field and spherical propagation models need to be considered. Near-field effects are reflected on both the magnitude and phase of the channel entries and magnitude depends on the free-space path-loss, the polarization mismatch and the effective aperture area of the antenna. For reconfigurable antenna elements 26 of side-length $$\frac{\lambda}{2} = \frac{f}{2c},$$

the magnitude of the channel between element m of the first IRS 14 and the antenna 28 of the relay 18, $[\varsigma_t]_m$, can be approximated as $$[\varsigma_t]_m = \left(\frac{G_t}{4\pi}\sum_{x\in\mathcal{X}}\sum_{y\in\mathcal{Y}}\left(\frac{C_{x,y}}{3\left(\frac{y^2}{d^2}+1\right)} + \frac{2}{3}\tan^{-1}C_{x,y}\right)\right)^{\frac{1}{2}} \quad \text{Equation 7}$$

with $$C_{x,y} = \frac{\frac{xy}{d^2}}{\sqrt{\frac{y^2}{d^2} + \frac{y^2}{d^2} + 1}} \quad \text{Equation 8}$$

where $$\mathcal{X} = \left\{\frac{c}{4f\sqrt{\pi}} + x_m - x_0, \frac{c}{4f\sqrt{\pi}} - x_m + x_0\right\} \text{ and}$$

$$\mathcal{Y} = \left\{\frac{c}{4f\sqrt{\pi}} + y_m - y_0, \frac{c}{4f\sqrt{\pi}} - y_m + y_0\right\},$$

with c and f denoting the speed of light and carrier frequency. The height of the relay antenna is denoted by $d=|z_m-z_0|$ and the gain of the horn antenna over the isotropic antenna is represented by $G_t$.

Finally, following the spherical wave equations, the phase factor of the channel between the mth element of the first IRS 14 and the antenna 28 of the relay 18, which is captured in the mth element of $\Theta_t$, can be written as $$[\Theta_t]_m = e^{j\frac{2\pi}{\lambda}\sqrt{(x_m-x_0)^2+(y_m-y_0)^2+d^2}} \quad \text{Equation 9}$$

where $\lambda$ is the wavelength.

IV. Achievable Rates

This section investigates the achievable spectral efficiency using the proposed relay-aided intelligent surface architecture. First, the spectral efficiency achieved by the standard intelligent surfaces and AF/DF relays is briefly reviewed. Then, the spectral efficiency of the proposed relay-aided intelligent surface architecture is derived with both AF and DF relays, respectively. In the following derivations, it is assumed that perfect channel state information is available at standard intelligent surfaces, relays, and relay-aided IRSs.

A. Standard Intelligent Surfaces

First, spectral efficiency of standard intelligent surfaces is derived for comparison purposes. By adopting the same channel definitions for the transmitter-intelligent surface and intelligent surface-receiver channels, i.e., $h_t$ and $h_r$, the received signal is formulated as $$y_r = \sqrt{p_t}h_r^T\Psi h_t s + n_2 \quad \text{Equation 10}$$

where $n_2$ is the receiver noise as defined previously, and $\Psi = \text{diag}(\psi)$ is the interaction matrix of the intelligent surface with $\psi = \sqrt{\kappa}[e^{j\phi_1}, \ldots, e^{j\phi_M}]$. The spectral efficiency of standard intelligent surfaces can be written as $$R_{IS} = \max_{\psi} \log_2\left(1 + \frac{p_t\kappa|(h_t \odot h_r)^T\psi|^2}{\sigma_2^2}\right) \quad \text{Equation 11}$$

$$= \log_2\left(1 + \frac{p_t\kappa\left(\sum_{m=1}^{M}|[h_t]_m||[h_r]_m|\right)^2}{\sigma_2^2}\right) \quad \text{Equation 12}$$

$$= \log_2\left(1 + \frac{p_t\kappa M^2 \xi_{t,r}}{\sigma_2^2}\right) \quad \text{Equation 13}$$

$$\leq \log_2\left(1 + \frac{p_t\kappa M^2 \zeta_t \zeta_r}{\sigma_2^2}\right) \quad \text{Equation 14}$$

Note that Equation 11 is obtained by a transformation of Equation 10 similar to Equation 1 and Equation 2. In Equation 12, the intelligent surface is configured to maximize the gain via applying inverse phase shift of combined receive and transmit channels such that $\phi_m^3 = -\angle [h_t]_m[h_r]_m$. The results in Equation 13 are in a compact form by defining $$\xi_{t,r} = \left(\frac{1}{M}\sum|[h_t]_m||[h_r]_m|\right)^2.$$

Moreover, it can be upper-bounded with Cauchy-Schwarz inequality as given in Equation 14 with the definitions $$\zeta_t = \frac{1}{M}\sum|[h_t]_m|^2 \text{ and } \zeta_r = \frac{1}{M}\sum|[h_r]_m|^2$$

Line-of-sight (LOS) scenario: The expression in Equation 13 can be further simplified in the case where only LOS path is available. In this case, the channel between the transmitter and the intelligent surface follows Equation 6 for L=1 and $\alpha_1=1$ resulting in $h_t=\sqrt{\rho_t}a(\theta_\ell^{az}, \theta_\ell^{el})$. Hence, $\xi_{t,r}=\rho_t\rho_r$ and $$R_{IS} = \log_2\left(1 + \frac{p_t\kappa M^2\rho_t\rho_r}{\sigma_2^2}\right) \quad \text{Equation 15}$$

which is a similar expression to the upper-bound defined in Equation 14, however, the equality is exactly satisfied with the scalar channel gain values $\sigma_t$ and $\sigma_r$.

B. Standard Relays

A standard relay with a single antenna in each direction is also considered, again adopting the same channel definitions $h_t$, $h_r$ for M=1. The spectral efficiency of the relay models follows the derivations of a classical work with trivial changes due to (i) the absence of LOS channel between the transmitter and source, and (ii) the full-duplex operation without any interference.

1) DF Relay: With the given definitions, spectral efficiency of the DF relay can be written by $$R_{Relay}^{DF} = \log_2\left(1 + \min\left\{\frac{p_t\zeta_t}{\sigma_1^2}, \frac{p_r\zeta_r}{\sigma_2^2}\right\}\right) \quad \text{Equation 16}$$

which simply selects the minimum rate of two channels utilized in the transmission.

2) AF Relay: For AF operation, the relay amplifies the received signal with the amplifying coefficient β, leading to $$R_{Relay}^{AF} = \log_2\left(1 + \frac{p_t \beta \zeta_t \zeta_r}{\beta \zeta_r \sigma_1^2 + \sigma_2^2}\right) \quad \text{Equation 17}$$

Note that the relay is subject to a power constraint $p_r$, resulting in constraint $$\beta \leq \frac{p_r}{p_t \zeta_t + \sigma_1^2}.$$

For the equality where full power is applied by the relay, the expression can be further simplified to $$\bar{R}_{Relay}^{AF} = \log_2\left(1 + \frac{\frac{p_t \zeta_t}{\sigma_1^2} \cdot \frac{p_r \zeta_r}{\sigma_2^2}}{\left(\frac{p_t \zeta_t}{\sigma_1^2} + \frac{p_r \zeta_r}{\sigma_2^2} + 1\right)}\right) \quad \text{Equation 18}$$

C. Relay-Aided Intelligent Surface

Recall that relay-aided intelligent surfaces can adopt either DF or AF operations depending on application. For instance, a DF relay is preferable for frequency selective fading channels, while an AF relay is favored when less transmission latency between a base station and a user is required. Gains of the IRSs 14, 16 are taken to be equal as they are identical, i.e., $\kappa_1 = \kappa_2 = \kappa$. To derive spectral efficiency of relay-aided intelligent surfaces, the transmitter-relay direction is written as $$R_t = \max_{\psi_1} \log_2\left(1 + \frac{p_t \kappa |(h_t \odot g_t)^T \psi_1|^2}{\sigma_1^2}\right) \quad \text{Equation 19}$$

$$= \max_{\psi_1} \log_2\left(1 + \frac{p_t \kappa |(h_t^\circ)^T \psi_1|^2}{\sigma_1^2}\right) \quad \text{Equation 20}$$

$$= \max_{\phi_1^1, \ldots, \phi_M^1} \log_2\left(1 + \frac{p_t \kappa \left(\sum_{m=1}^M [h_t^\circ]_m e^{j\phi_m^1}\right)^2}{\sigma_1^2}\right) \quad \text{Equation 21}$$

$$= \log_2\left(1 + \frac{p_t \kappa M^2 \xi_t^\circ}{\sigma_1^2}\right) \quad \text{Equation 22}$$

where Equation 22 is obtained by setting $\phi_M^1 = -\angle [h_t^\circ]_m$ maximizing the expression, and defining $$\xi_t^\circ = \left(\frac{1}{M}\sum |[h_t^\circ]_m|\right)^2.$$

By applying the same operations in Equations 19-22, the spectral efficiency of relay-receiver direction can be written as $$R_r = \log_2\left(1 + \frac{p_t \kappa M^2 \xi_r^\circ}{\sigma_2^2}\right) \quad \text{Equation 23}$$

with the phase shift values of the second IRS 16 being selected as $\phi_M^2 = \angle [h_r^\circ]_m$ and $$\xi_r^\circ = \left(\frac{1}{M}\sum |[h_r^\circ]_m|\right)^2.$$

1) DF Relay Operation: In a similar way to Equation 16, a DF-relay-aided intelligent surface can support the spectral efficiency $$R_{RIR}^{DF} = \min\{R_t, R_f\} = \log_2\left(1 + \kappa M^2 \cdot \min\left\{\frac{p_t \xi_t^\circ}{\sigma_1^2}, \frac{p_r \xi_r^\circ}{\sigma_2^2}\right\}\right) \quad \text{Equation 24}$$

where $R_t$ in Equation 24 shows the maximum rate at which the relay can reliably decode, while $R_f$ is the maximum rate at which the relay can reliably transmit to the receiver.

LOS scenario: For the LOS case, the channels follow Equation 6 with L=1 and $\alpha_1 = 1$ leading to $h_t = \sqrt{\rho_t} a(\theta_\ell^{az}, \theta_\ell^{el})$. Moreover, $\xi_r^\circ = \rho_t \eta_t$ can be expanded with the definition $$\eta_t = \left(\frac{1}{M}\sum |[g_t]_m|\right)^2.$$

The spectral efficiency becomes $$R_{RIR}^{DF} = \log_2\left(1 + \kappa M^2 \cdot \min\left\{\frac{p_t \rho_t \eta_t}{\sigma_1^2}, \frac{p_r \rho_r \eta_r}{\sigma_2^2}\right\}\right) \quad \text{Equation 25}$$

In addition, the near-field gain can be bounded by $$\frac{\eta_t}{M} \leq 1$$

due to the conservation of energy, resulting in $$R_{RIR}^{DF} \leq \log_2\left(1 + \kappa M \cdot \min\left\{\frac{p_t \rho_t}{\sigma_1^2}, \frac{p_r \rho_r}{\sigma_2^2}\right\}\right) \quad \text{Equation 26}$$

Note that this expression clearly indicates the proposed relay-aided intelligent surface model can offer κM gain on SNR of DF-relay with a LOS path as can be seen by setting ς=p in Equation 16.

2) AF Relay Operation: In a similar way to Equation 17, for the AF-relay-aided intelligent surface, the spectral efficiency can be formulated by $$R_{RIR}^{AF} = \log_2\left(1 + \frac{p_t \beta \kappa^2 M^4 \xi_{t,r}^\circ}{\beta \kappa M^2 \xi_r^\circ \sigma_1^2 + \sigma_2^2}\right) \quad \text{Equation 27}$$

for a given gain constraint $$\beta \leq \frac{p_r}{p_t \kappa M^2 \xi_t^\circ + \sigma_1^2} \quad \text{Equation 28}$$

Moreover, with the equality of Equation 28, similarly to Equation 18, the expression can be simplified to $$\bar{R}_{RIR}^{AF} = \log_2\left(1 + \frac{\frac{\kappa M^2 p_t \xi_t^\circ}{\sigma_1^2} \cdot \frac{\kappa M^2 p_r \xi_r^\circ}{\sigma_2^2}}{\frac{\kappa M^2 p_t \xi_t^\circ}{\sigma_1^2} + \frac{\kappa M^2 p_r \xi_r^\circ}{\sigma_2^2} + 1}\right) \quad \text{Equation 29}$$

LOS scenario: The same channel simplifications following the LOS scenario of the DF-Relay allow forming $$R_{RIR}^{AF} = \log_2\left(1 + \frac{p_t \beta \kappa^2 M^4 \rho_t \rho_r \eta_{t,r}}{\beta \kappa M^2 \rho_r \eta_r \sigma_1^2 + \sigma_2^2}\right) \quad \text{Equation 30}$$

with $$\eta_{t,r} = \left(\frac{1}{M}\sum |[g_t]_m||[g_r]_m|\right)^2$$

and Equation 28. Also, maximum near-field gain $$\frac{\eta_t}{M} \leq 1$$

can bound the spectral efficiency as $$R_{RIR}^{AF} \leq \log_2\left(1 + \frac{p_t \beta \kappa^2 M^2 \rho_t \rho_r}{\beta \kappa M \rho_r \sigma_1^2 + \sigma_2^2}\right) \quad \text{Equation 31}$$

since log(x), and $$\frac{ax^2}{bx+c}$$

for a, b, c, x≥0 are strictly increasing functions. In the case of equality of gain constraint, similar expressions to Equation 29 for only LOS path can readily be obtained.

V. How Many Antennas are Needed?

In addition to the achievable rates, the number of antennas needed for providing a given gain $R_{lim}$ over a fixed distance are investigated. To this end, the expressions for the standard intelligent surface, AF- and DF-relay-aided intelligent surface are derived from the corresponding spectral efficiency. For ease of notation, $\gamma_{lim} = 2^{R_{lim}} - 1$ is defined.

A. Standard Intelligent Surface

For the sake of a fair comparison, the standard intelligent surface is considered to have 2M antennas. Therefore, the inverse function of Equation 13 for 2M antennas with respect to M can be obtained as follows:

$$M_{IS} \geq \frac{1}{2}\sqrt{\frac{\gamma_{lim}\sigma_2^2}{p_t \kappa \xi_{t,r}}} \geq \frac{1}{2}\sqrt{\frac{\gamma_{lim}\sigma_2^2}{p_t \kappa \zeta_t \zeta_r}} \quad \text{Equation 32}$$

Note that this is a lower bound on M for an IRS with 2M antennas providing the rate $R_{lim}$.

B. Relay-Aided Intelligent Surface

1) DF Relay Operation: With DF-relay-aided intelligent surfaces, the number of antennas needed to provide the gain $R_{lim}$ can be derived as $$M_{RIR}^{DF} \geq \frac{\gamma_{lim}}{\kappa} \max\left\{\frac{\sigma_1^2}{p_t \xi_t^\circ}, \frac{\sigma_2^2}{p_r \xi_r^\circ}\right\} \quad \text{Equation 33}$$

using Equation 24.

2) AF Relay Operation: The number of antennas needed for AF-relay-aided intelligent surfaces depends on the gain and power limitation of the relay. Recall the gain constraint of Equation 28, which depends on M. For a given amplifier coefficient β, the positive solution $\tilde{M}_{RIR}^{AF}$ to the quadratic equation of $M^2$ is found and given by $$p_t \beta \kappa^2 \xi_{t,r}^\circ M^4 - \gamma_{lim} \beta \kappa \xi_r^\circ \sigma_1^2 M^2 \gamma_{lim} \sigma_2^2 \quad \text{Equation 34}$$

If corresponding $\tilde{M}_{RIR}^{AF}$ holds for Equation 28, then the maximum gain does not violate the power constraint and $M_{RIR}^{AF} = \tilde{M}_{RIR}^{AF}$. Otherwise, the system applies maximum power instead of the maximum relay gain through Equation 29 and the number of antennas needed in this case can be formulated as the positive solution of the following quadratic equation of $M^2$:

$$\frac{\kappa p_t \xi_t^\circ}{\sigma_1^2} \cdot \frac{\kappa p_r \xi_r^\circ}{\sigma_2^2} M^4 - \gamma_{lim}\left(\frac{\kappa p_t \xi_t^\circ}{\sigma_1^2} + \frac{\kappa p_r \xi_r^\circ}{\sigma_2^2}\right)M^2 - \gamma_{lim} \quad \text{Equation 35}$$

VI. Simulation Results

This section evaluates the performance of the proposed relay-aided intelligent surface architecture using numerical simulations.

A. Simulation Setup

Figure 5:
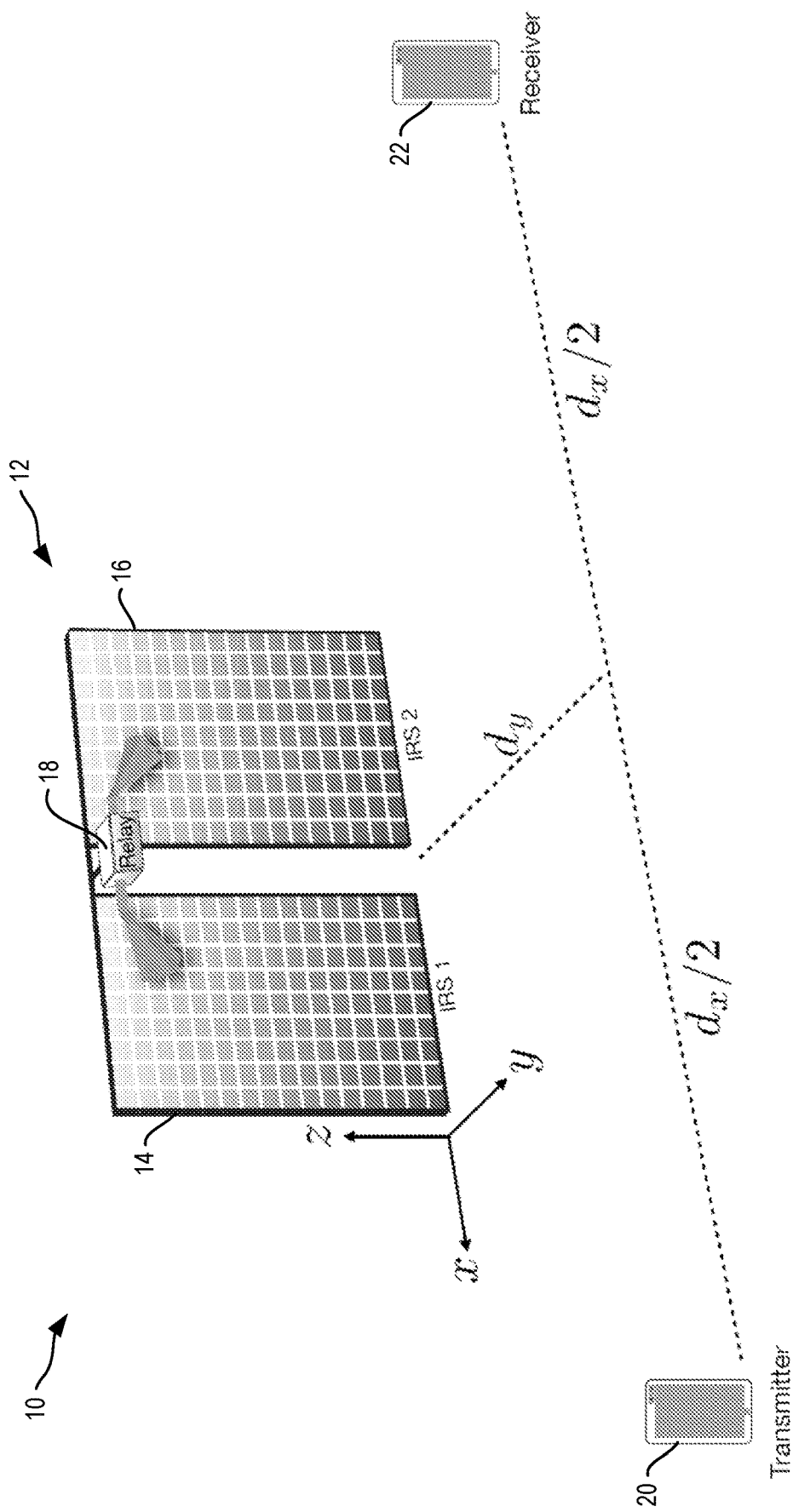
FIG. 5 is a schematic diagram of a wireless communication scenario in which the relay-aided intelligent surface device of FIGS. 1 and 2A assists communication between a single-antenna transmitter/receiver pair.

FIG. 5 is a schematic diagram of a wireless communications system in which the relay-aided intelligent surface device 12 of FIGS. 1 and 2A assists communication between a single-antenna transmitter/receiver pair. This scenario is adopted for simulating operation of the relay-aided intelligent surface device 12, where the transmitter 20 and receiver 22 are located at two points aligned on the y-axis and a separation $d_x$ on the x-axis. The intelligent surface/relay/relay-aided intelligent surface is placed at $d_y$=10 meters (m) away from the transmitter and receiver in y-axis while it is in the middle of them in x-axis. The heights of the transmitter 20 and intelligent surface/relay/relay-aided intelligent surface units (e.g., relay-aided intelligent surface device 12) are taken as 10 m and the receiver 22 as 1 m.

In this setup, the channel gains are generated by using the 3GPP Urban Micro (UMi)—street canyon model given as $$P_{loss} = 32.4 + 21 \log_{10}(d_{3D}) + 20 \log_{10}(f_c)$$

where $d_{3D}$ and $f_c$ denote the 3D LOS path distance in meters and carrier frequency in gigahertz (GHz), respectively. In the following simulations, the LOS scenario with the near-field upper-bounds is considered. The LOS channel gains $p_r$ and $p_t$ are computed with the UMi model and utilized in the achievable rates of standard intelligent surfaces, DF and AF relays, and the upper-bounds for DF- and AF-relay-aided intelligent surfaces through the equations derived in Sections IV and V.

As detailed earlier, the standard intelligent surface considers twice the size of reflection elements 2M for comparison as there are two IRSs 14, 16 adopted in the relay-aided intelligent surface. A transmitter power of $p_t$=20 decibels per milliwatt (dBm) and a relay maximum power of $p_r$=20 dBm are considered for all scenarios. Two different carrier frequency values 60 GHz and 3.5 GHz are considered, representing mmWave and sub-6 GHz channels. The noise figure is set at 8 decibels (dB) and the bandwidth is assumed to be 100 megahertz (MHz) at the 3.5 GHz band and 1 GHz at the 60 GHz band. A unitary reflection coefficient, $\alpha=1$, is adopted assuming perfect reflection at all the relay-aided intelligent surfaces and standard intelligent surfaces. For the simulations where AF relay gain is given by $\beta$, the relays apply the minimum of $\beta$ amplification gain using maximum power.

B. Achievable Rates

Figure 6:
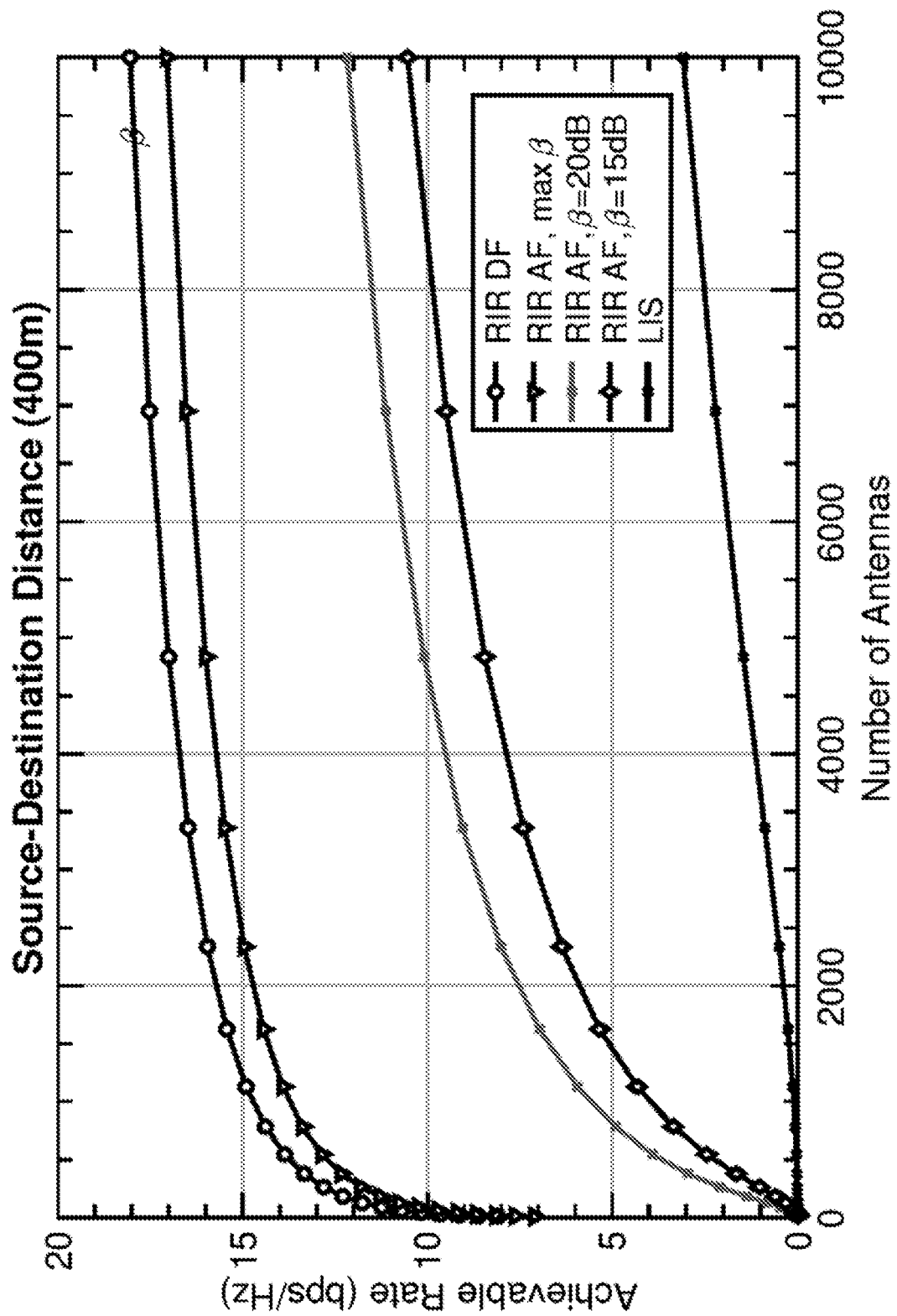
FIG. 6 is a graphical representation of achievable rates of an embodiment of the relay-aided intelligent surface device of FIGS. 1 and 2A compared with a traditional intelligent surface at different numbers of surface antennas.

FIG. 6 is a graphical representation of achievable rates of an embodiment of the relay-aided intelligent surface device 12 of FIGS. 1 and 2A compared with a traditional intelligent surface at different numbers of surface antennas. First, the achievable rates are investigated for varying number of antennas M over a fixed distance $d_x=400$ m between the transmitter 20 and receiver 22. FIG. 6 plots the achievable rates with respect to the number of antennas considering a setup operating at 3.5 GHz and with a bandwidth 100 MHz. The proposed relay-aided intelligent surface architecture achieves much higher spectral efficiency compared to the classical IRS at any fixed number of antennas. Further, this figure illustrates that relay-aided IRS with a DF achieves higher gain compared to the relay-aided IRS with AF relay (for the case of maximum used $\beta$). DF relays, however, require relatively higher hardware complexity and latency (initial offset) overhead which is the cost of the higher achievable rate.

FIG. 6 also plots the achievable rates with the proposed relay-aided intelligent surface architecture with AF relays under different realistic values for the amplification gains $\beta$. In general, however, the relay-aided intelligent surface with AF and reasonable amplification gain results in better performance compared to the traditional intelligent surface. This is because the traditional intelligent surface requires a massive amount of antennas to provide acceptable SNR gains, while the proposed relay-aided intelligent surface architecture splits the target SNR gain between the number of reconfigurable antenna elements 26 and the amplification gain.

Figure 7:
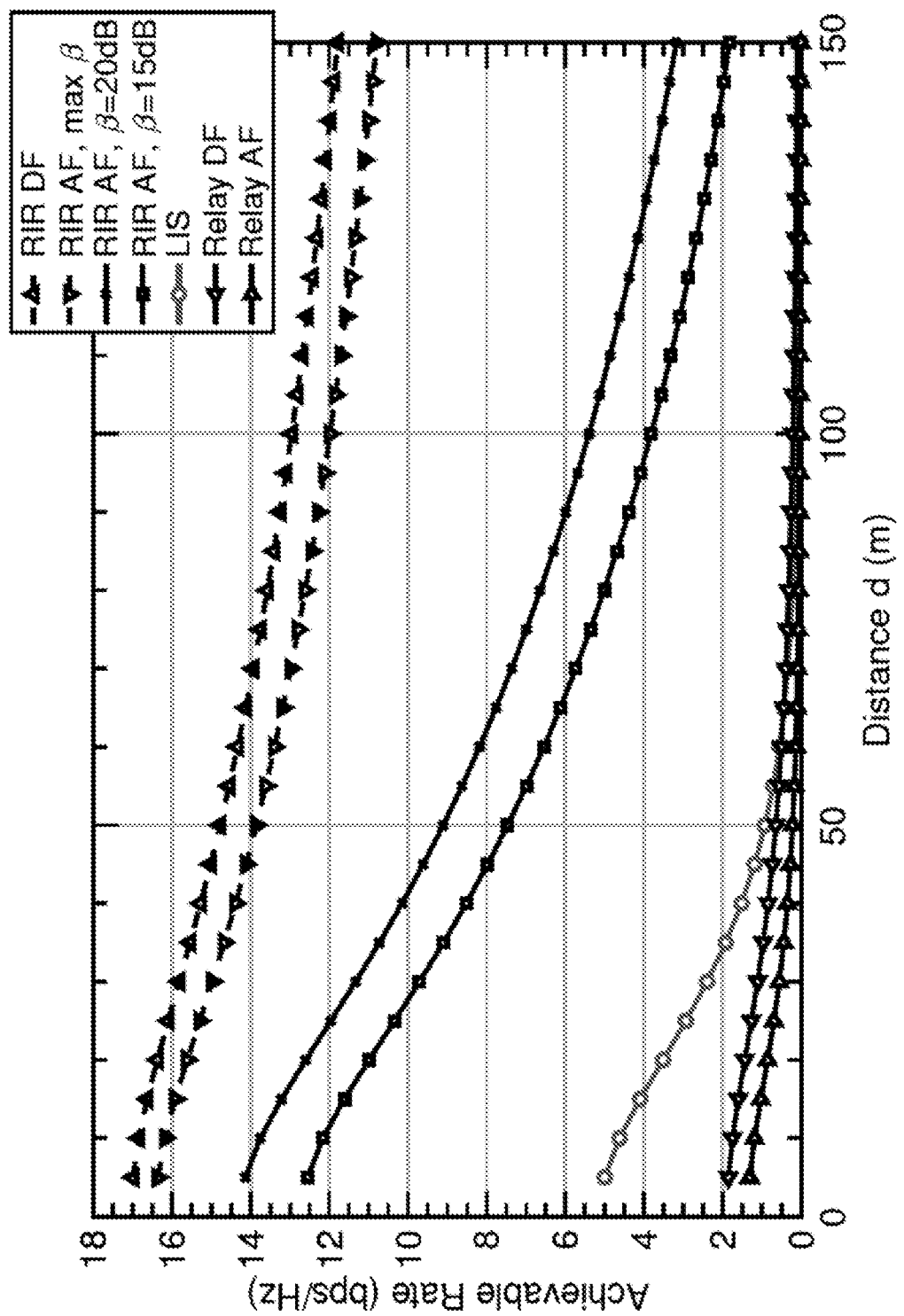
FIG. 7 is a graphical representation of achievable rates of an embodiment of the relay-aided intelligent surface device of FIGS. 1 and 2A compared with a traditional intelligent surface at different distances between the transmitter and receiver.

FIG. 7 is a graphical representation of achievable rates of an embodiment of the relay-aided intelligent surface device 12 of FIGS. 1 and 2A compared with a traditional intelligent surface at different distances between the transmitter and receiver. At the 60 GHz band, the achievable rates using these different architectures are evaluated in FIG. 7 for different values of the distance between the transmitter and receiver. This figure emphasizes the potential gain of the proposed relay-aided intelligent surface architecture compared to both traditional intelligent surfaces and standard single-antenna relays.

C. How Many Elements Are Needed?

Next, the number of reconfigurable antenna elements 26 needed to provide a fixed rate for varying distances between the transmitter 20 and receiver 22 is examined. Note that distance between the first IRS 14 and the second IRS 16 also increases with the increasing distance as shown in FIG. 5.

Figure 8:
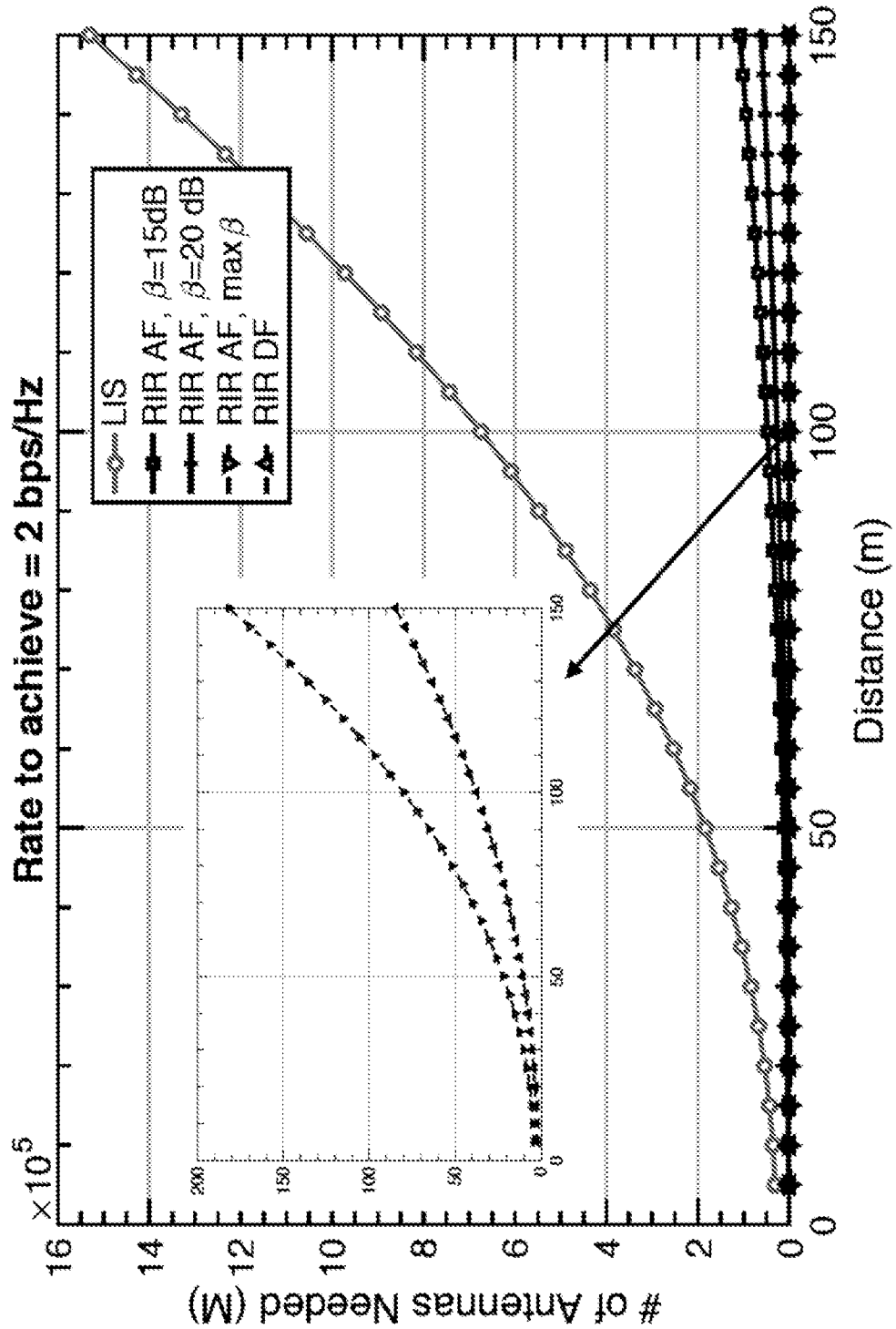
FIG. 8 is a graphical representation of a number of antenna elements needed by the relay-aided intelligent surface device of FIGS. 1 and 2A to achieve a target spectral efficiency.

FIG. 8 is a graphical representation of a number of reconfigurable antenna elements 26 needed by the relay-aided intelligent surface device 12 of FIGS. 1 and 2A to achieve a target spectral efficiency. FIG. 8 shows the required number of reconfigurable antenna elements 26 providing a fixed target rate $R_{lim}=2$ bits per second over hertz (bps/Hz) at 60 GHz carrier frequency. The number of reconfigurable antenna elements 26 needed scales exponentially for traditional intelligent surfaces and is much larger than the relay-aided intelligent surface architecture.

With the traditional intelligent surface architecture, the required number of elements easily exceeds 100,000 over 25 m. On the other hand, FIG. 8 shows that this number is only needed for the relay-aided intelligent surface architecture with AF at a distance 150 m and amplification gain $\beta=15$ dB. Increasing the amplification gain to 20 dB can further reduce this number to 50,000 elements. Further, this figure shows that the proposed relay-aided intelligent surface architecture with DF relay may need a much smaller number of reconfigurable antenna elements 26. At 150 m, only 100 reconfigurable antenna elements 26 per surface are needed for the relay-aided intelligent surface architecture with DF to achieve the same target SNR. In general, FIG. 8 shows that the proposed relay-aided intelligent surface architecture can significantly reduce the required number of reconfigurable antenna elements 26 to achieve a reasonable achievable rate target at different distances yielding a promising solution for practical deployments of IRSs.

VII. Process for Providing Amplified Signal Reflection

Figure 9:
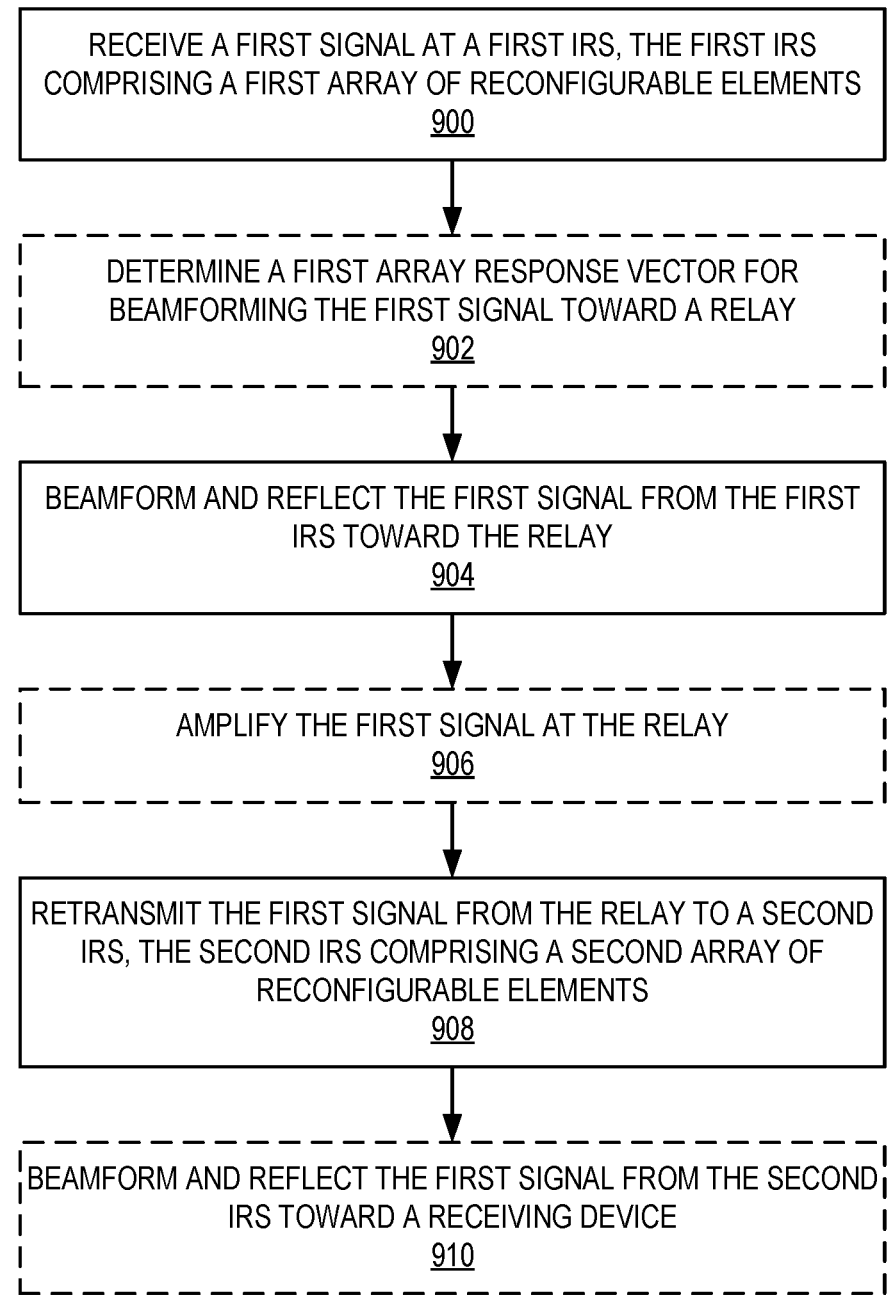
FIG. 9 is a flow diagram illustrating a process for providing amplified signal reflection.

FIG. 9 is a flow diagram illustrating a process for providing amplified signal reflection. Dashed boxes represent optional steps. The process begins at operation 900, with receiving a first signal at a first IRS, the first IRS comprising a first array of reconfigurable elements. The process optionally continues at operation 902, with determining a first array response vector for beamforming the first signal toward a relay. The process continues at operation 904, with beamforming and reflecting the first signal from the first IRS toward the relay. The process optionally continues at operation 906, with amplifying the first signal at the relay. The process continues at operation 908, with retransmitting the first signal from the relay to a second IRS, the second IRS comprising a second array of reconfigurable elements. The process optionally continues at operation 910, with beamforming and reflecting the first signal from the second IRS toward a receiving device.

Although the operations of FIG. 9 are illustrated in a series, this is for illustrative purposes and the operations are not necessarily order dependent. Some operations may be performed in a different order than that presented. Further, processes within the scope of this disclosure may include fewer or more steps than those illustrated in FIG. 9.

VIII. Computer System

Figure 10:
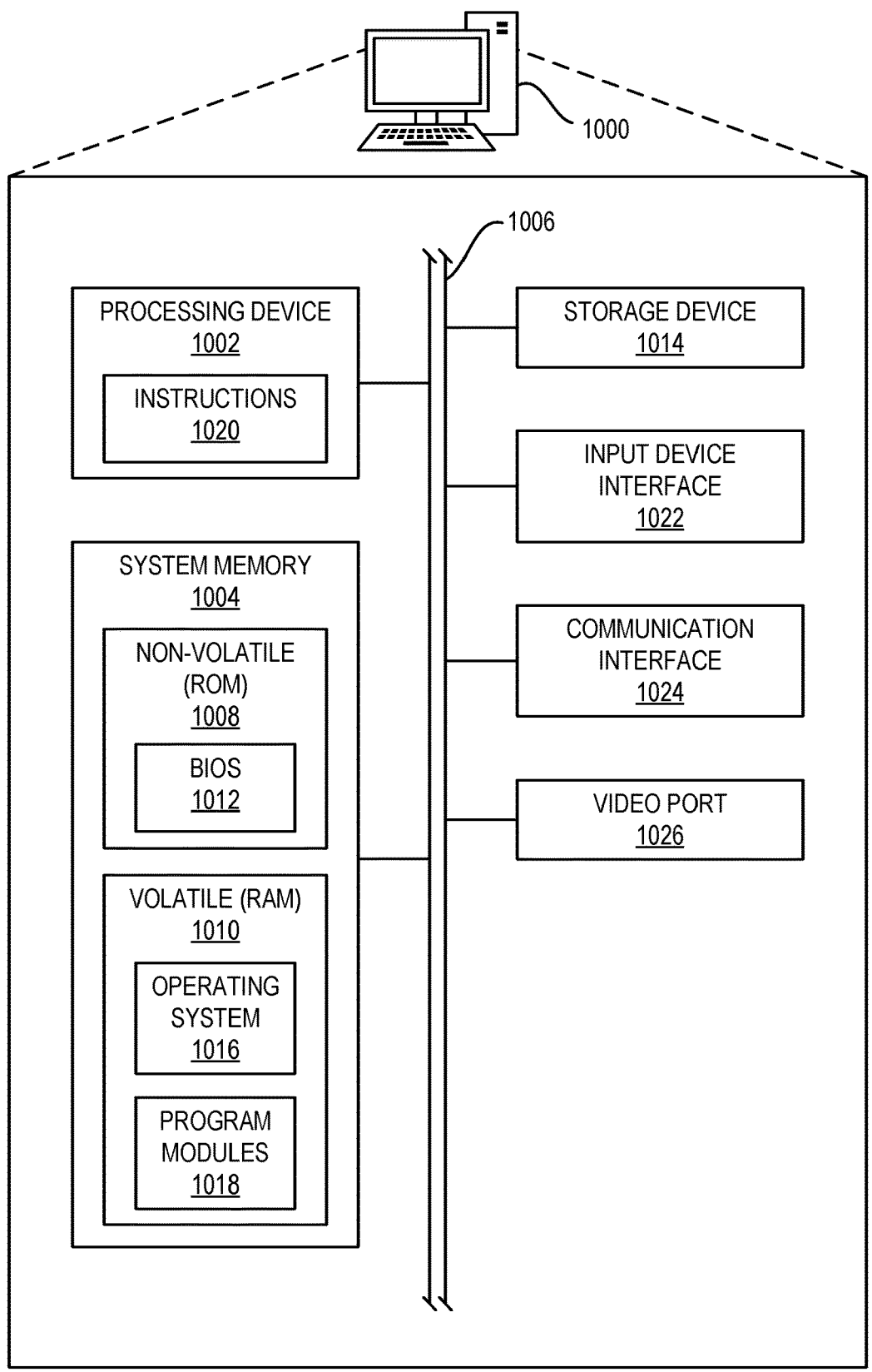
FIG. 10 is a block diagram of a computer system suitable for operating a relay-aided intelligent surface device according to embodiments disclosed herein.

FIG. 10 is a block diagram of a computer system 1000 suitable for operating a relay-aided intelligent surface device according to embodiments disclosed herein. In some embodiments, one or more relays 18 in the relay-aided intelligent surface device 12 of FIGS. 1-2C are coupled to or include the computer system 1000. The computer system 1000 comprises any computing or electronic device capable of including firmware, hardware, and/or executing software instructions that could be used to perform any of the methods or functions described above, such as configuring reconfigurable elements of one or more IRSs. The computer system 1000 may be implemented in an IRS controller connected to an IRS, in a network server (e.g., an application server of a cellular network), in a server at a network edge, in a cloud server, or a combination of these. In this regard, the computer system 1000 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 1000 in this embodiment includes a processing device 1002 or processor, a system memory 1004, and a system bus 1006. The system memory 1004 may include non-volatile memory 1008 and volatile memory 1010. The non-volatile memory 1008 may include read-only memory (ROM), erasable programmable read-only memory (EPROM), electrically erasable programmable read-only memory (EEPROM), and the like. The volatile memory 1010 generally includes random-access memory (RAM) (e.g., dynamic random-access memory (DRAM), such as synchronous DRAM (SDRAM)). A basic input/output system (BIOS) 1012 may be stored in the non-volatile memory 1008 and can include the basic routines that help to transfer information between elements within the computer system 1000.

The system bus 1006 provides an interface for system components including, but not limited to, the system memory 1004 and the processing device 1002. The system bus 1006 may be any of several types of bus structures that may further interconnect to a memory bus (with or without a memory controller), a peripheral bus, and/or a local bus using any of a variety of commercially available bus architectures.

The processing device 1002 represents one or more commercially available or proprietary general-purpose processing devices, such as a microprocessor, central processing unit (CPU), or the like. More particularly, the processing device 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 1002 is configured to execute processing logic instructions for performing the operations and steps discussed herein.

In this regard, the various illustrative logical blocks, modules, and circuits described in connection with the embodiments disclosed herein may be implemented or performed with the processing device 1002, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 1002 may be a microprocessor, or may be any conventional processor, controller, microcontroller, or state machine. The processing device 1002 may also be implemented as a combination of computing devices (e.g., a combination of a DSP and a microprocessor, a plurality of microprocessors, one or more microprocessors in conjunction with a DSP core, or any other such configuration).

The computer system 1000 may further include or be coupled to a non-transitory computer-readable storage medium, such as a storage device 1014, which may represent an internal or external hard disk drive (HDD), flash memory, or the like. The storage device 1014 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 1016 and any number of program modules 1018 or other applications can be stored in the volatile memory 1010, wherein the program modules 1018 represent a wide array of computer-executable instructions corresponding to programs, applications, functions, and the like that may implement the functionality described herein in whole or in part, such as through instructions 1020 on the processing device 1002. The program modules 1018 may also reside on the storage mechanism provided by the storage device 1014. As such, all or a portion of the functionality described herein may be implemented as a computer program product stored on a transitory or non-transitory computer-usable or computer-readable storage medium, such as the storage device 1014, volatile memory 1010, non-volatile memory 1008, instructions 1020, and the like. The computer program product includes complex programming instructions, such as complex computer-readable program code, to cause the processing device 1002 to carry out the steps necessary to implement the functions described herein.

An operator, such as the user, may also be able to enter one or more configuration commands to the computer system 1000 through a keyboard, a pointing device such as a mouse, or a touch-sensitive surface, such as the display device, via an input device interface 1022 or remotely through a web interface, terminal program, or the like via a communication interface 1024. The communication interface 1024 may be wired or wireless and facilitate communications with any number of devices via a communications network in a direct or indirect fashion. An output device, such as a display device, can be coupled to the system bus 1006 and driven by a video port 1026. Additional inputs and outputs to the computer system 1000 may be provided through the system bus 1006 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A relay for an intelligent surface device, comprising:
a first antenna port configured to receive a first signal from a first intelligent reconfigurable surface (IRS);
amplification circuitry configured to amplify the first signal; and
a second antenna port configured to send the amplified first signal to be transmitted from a second IRS.

2. The relay of claim 1, wherein:
the second antenna port is further configured to receive a second signal from the second IRS;
the amplification circuitry is further configured to amplify the second signal; and
the first antenna port is further configured to send the amplified second signal to be transmitted from the first IRS.

3. The relay of claim 1, further comprising a first antenna coupled to the first antenna port and configured to receive the first signal via wireless communication with the first IRS.

4. The relay of claim 3, wherein:
the first IRS and the second IRS are located apart from one another; and
the second antenna port is configured to send the amplified first signal via the wireless communication with the second IRS.

5. The relay of claim 1, wherein the first antenna port is configured to receive the first signal via a wired connection to the first IRS.

6. The relay of claim 5, wherein the second antenna port is configured to send the amplified first signal via the wired connection to the second IRS.

7. The relay of claim 6, wherein:
the first IRS comprises the second IRS; and
the relay is embedded in the first IRS.

8. The relay of claim 7, wherein:
the first antenna port is coupled to a first antenna element of the first IRS; and
the second antenna port is coupled to the first antenna element of the first IRS.

9. The relay of claim 7, wherein:
the first antenna port is coupled to a first group of antenna elements of the first IRS; and
the second antenna port is coupled to a second group of the antenna elements of the first IRS distinct from the first group.

10. The relay of claim 7, wherein each of the first antenna port and the second antenna port are coupled to a first group of antenna elements of the first IRS.

11. The relay of claim 5, wherein the second antenna port is configured to send the amplified first signal via wireless communication with the second IRS.

12. The relay of claim 1, further comprising a first antenna coupled to the first antenna port and a second antenna coupled to the second antenna port;
wherein each of the first antenna and the second antenna comprises one of a horn antenna or a phased antenna array.

13. A method for providing amplified signal reflection, the method comprising:
receiving a first signal at a first intelligent reconfigurable surface (IRS), the first IRS comprising a first array of reconfigurable elements;
beamforming and reflecting the first signal from the first IRS toward a relay; and
retransmitting the first signal from the relay to a second IRS, the second IRS comprising a second array of the reconfigurable elements.

14. The method of claim 13, further comprising determining a first array response vector for beamforming the first signal toward the relay.

15. The method of claim 13, further comprising amplifying the first signal at the relay.

16. The method of claim 13, further comprising beamforming and reflecting the first signal from the second IRS toward a receiving device.

17. A wireless communications system, comprising:
a first intelligent reconfigurable surface (IRS) comprising a first array of reconfigurable elements; and
a first relay configured to:
amplify and relay a first signal from the first IRS to a second IRS; and
amplify and relay a second signal from the second IRS to the first IRS.

18. The wireless communications system of claim 17, wherein:
the first relay receives the first signal from a first group of antenna elements of the first IRS; and
the wireless communications system further comprises a second relay configured to amplify and relay a third signal from a second group of the antenna elements of the first IRS to the second IRS.

19. The wireless communications system of claim 18, wherein the first relay and the second relay have shared signal processing circuitry.

20. The wireless communications system of claim 17, wherein the first IRS is collocated and oriented substantially parallel with the second IRS.

21. The wireless communications system of claim 17, wherein the first IRS and the second IRS are separated from one another.

* * * * *